United States Patent
Perkins et al.

(10) Patent No.: US 10,012,763 B2
(45) Date of Patent: Jul. 3, 2018

(54) UTILIZING FLUID PHASE BEHAVIOR INTERPRETATION TO INCREASE SENSOR MEASUREMENT INFORMATION ACCURACY

(71) Applicant: Halliburton Energy Services, Inc., Houston, TX (US)

(72) Inventors: David L. Perkins, The Woodlands, TX (US); Li Gao, Katy, TX (US); Christopher Michael Jones, Houston, TX (US); Dingding Chen, Tomball, TX (US); Michael T. Pelletier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 412 days.

(21) Appl. No.: 14/427,939

(22) PCT Filed: Nov. 7, 2013

(86) PCT No.: PCT/US2013/068868
§ 371 (c)(1),
(2) Date: Mar. 12, 2015

(87) PCT Pub. No.: WO2015/069249
PCT Pub. Date: May 14, 2015

(65) Prior Publication Data
US 2016/0011331 A1    Jan. 14, 2016

(51) Int. Cl.
*E21B 47/00* (2012.01)
*G01V 99/00* (2009.01)
*G01V 13/00* (2006.01)

(52) U.S. Cl.
CPC .............. *G01V 99/00* (2013.01); *E21B 47/00* (2013.01); *G01V 13/00* (2013.01)

(58) Field of Classification Search
CPC ......... E21B 47/00; G01V 13/00; G01V 99/00
See application file for complete search history.

(56) References Cited

U.S. PATENT DOCUMENTS

| | | | |
|---|---|---|---|
| 6,028,307 A | 2/2000 | Yooung et al. | |
| 7,316,278 B2 | 1/2008 | Hutchinson | |

(Continued)

FOREIGN PATENT DOCUMENTS

| | | |
|---|---|---|
| WO | WO-2008103986 A1 | 8/2008 |
| WO | WO-2008107181 A1 | 9/2008 |

(Continued)

OTHER PUBLICATIONS

"International Application Serial No. PCT/US2013/068868, International Search Report dated Aug. 13, 2014", 4 pgs.

(Continued)

*Primary Examiner* — Bryan Bui
(74) *Attorney, Agent, or Firm* — Gilliam IP PLLC (57) ABSTRACT

Various embodiments include apparatus and methods to utilize fluid phase behavior interpretation to increase sensor measurement accuracy. In some embodiments, a downhole sensor measures detector responses within a measurement sample of a downhole fluid. The measured detector responses are acquired from the downhole sensor. A correlation factor is generated as a scalar product between a vector of the measured detector responses and a vector of known responses. The correlation factor has a value within a fixed interval, one end of the fixed interval corresponding to a high correlation status and an opposite end of the fixed interval corresponding to an uncorrelated status. The correlation factor is compared to a correlation threshold for a specified material and sets of data having correlation factors greater than the correlation threshold are identified.

16 Claims, 8 Drawing Sheets

(56) References Cited

U.S. PATENT DOCUMENTS

| | | | |
|---|---|---|---|
| 7,317,989 | B2 | 1/2008 | DiFoggio et al. |
| 8,290,721 | B2 | 10/2012 | Wehrs et al. |
| 8,296,114 | B2 | 10/2012 | Prasad et al. |
| 8,335,650 | B2 | 12/2012 | Hsu et al. |
| 9,062,528 | B2 * | 6/2015 | Mitchell ............... E21B 47/022 |
| 2007/0016389 | A1 | 1/2007 | Ozgen |
| 2008/0186805 | A1 | 8/2008 | Han |
| 2008/0234988 | A1 | 9/2008 | Chen et al. |
| 2010/0140496 | A1 | 6/2010 | Pingnet et al. |
| 2011/0139464 | A1 | 6/2011 | Henderson et al. |
| 2011/0288843 | A1 | 11/2011 | Weng et al. |
| 2011/0301877 | A1 | 12/2011 | Wee et al. |
| 2012/0118637 | A1 | 5/2012 | Wang et al. |
| 2012/0123756 | A1 | 5/2012 | Wang et al. |
| 2013/0031964 | A1 | 2/2013 | Tunheim et al. |
| 2013/0127900 | A1 | 5/2013 | Pena et al. |

FOREIGN PATENT DOCUMENTS

| | | |
|---|---|---|
| WO | WO-2008107181 A9 | 9/2008 |
| WO | WO-2010009085 A2 | 1/2010 |
| WO | WO-2010039757 A1 | 4/2010 |
| WO | WO-2010068118 A1 | 6/2010 |

OTHER PUBLICATIONS

"International Application Serial No. PCT/US2013/068868, Written Opinion dated Aug. 13, 2014", 8 pgs.

* cited by examiner

UTILIZING FLUID PHASE BEHAVIOR INTERPRETATION TO INCREASE SENSOR MEASUREMENT INFORMATION ACCURACY

PRIORITY APPLICATIONS

This application is a U.S. National Stage Filing under 35 U.S.C. 371 from International Application No. PCT/US2013/068868, filed on 7 Nov. 2013, which application is incorporated herein by reference in its entirety.

TECHNICAL FIELD

The present invention relates generally to apparatus and methods related to measurements and analysis of measurement data.

BACKGROUND

In drilling wells for oil and gas exploration, understanding the structure and properties of the associated geological formation provides information to aid such exploration. Measurements in a wellbore, also referred to as a borehole, are typically performed to attain this understanding. However, the environment in which the drilling tools operate is at significant distances below the surface and measurements to manage operation of such equipment are made at these locations. The usefulness of such measurements may be related to the precision or quality of the information derived from the measurements. On-going efforts are being directed to improving techniques to enhance the precision or the quality of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
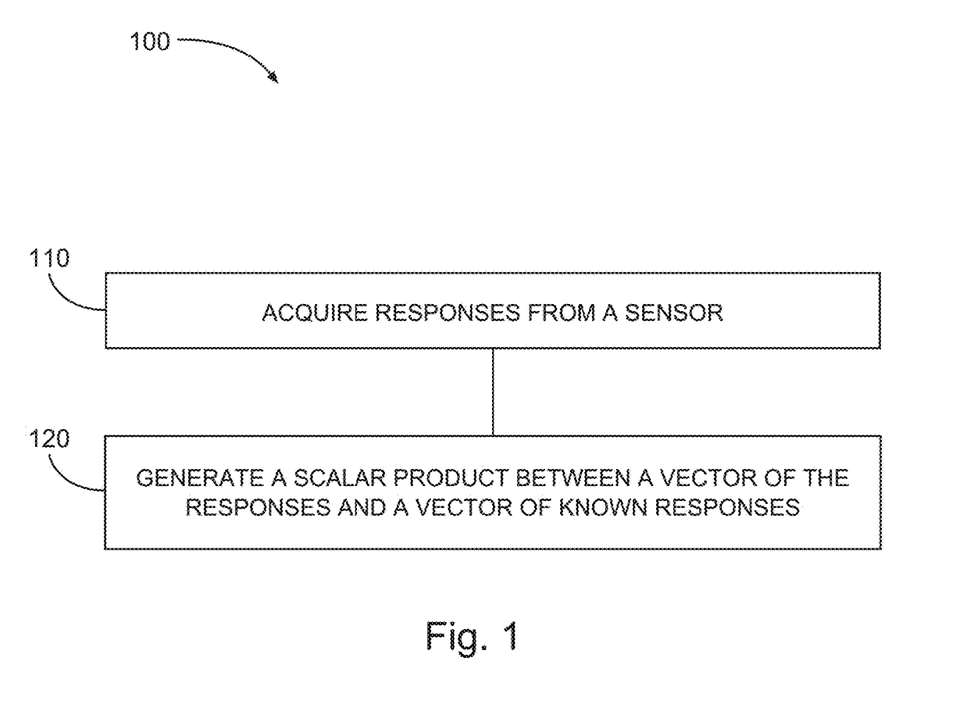
FIG. 1 shows features of an example method to provide correlation analysis of data, in accordance with various embodiments.

FIG. 1 shows features of an embodiment of an example method to provide correlation analysis of data. At 110, responses are acquired from a sensor that measures a sample or system. The sensor may be one or more devices, which can be mechanical, electrical (i.e. pressure) based, acoustic based, nuclear based, or optical based devices. The responses may be one or more responses. For example, the responses can be a measure of the system physical properties such as pressure, temperature, density, resistivity, or capacitance. The responses can be a measure of the system chemical composition. At 120, a scalar product is generated between a vector of the responses and a vector of known responses. Generating the scalar product can be performed such that a correlation factor is generated having a value within a fixed interval, one end of the fixed interval corresponding to a high correlation status and an opposite end of the fixed interval corresponding to an uncorrelated status. The known responses can be retrieved from a library of responses. The acquired measurement responses and the known responses may be in terms of values of current, voltage, frequency, counts, count rates, intensity, or other parameter, depending on the measurement devices from which measurement signals are acquired and can be processed for analysis and possible storage in a response library. The responses and the known responses can be normalized and the fixed interval can be an interval from zero to one. Such an interval may include zero and one. These operations can be performed by one or more processors operating to execute a number of procedures. These procedures can include using the correlation factor to identify occurrence of a single phase in an operation on a fluid.

The method or a similar method can include comparing the correlation factor to a correlation threshold for a specified material, and identifying sets of data having correlation factors greater than the correlation threshold. Responses can be acquired in a well-related operation, and correlation of the responses can be performed with respect to oil, water, or both oil and water. Contamination levels can be determined during a pump out operation in a well-related operation. Correlation of the responses can be used to determine a calibration to be used in a well-related operation, based on a set of known oils in a database. Correlation of the responses can be used to sort data for performance prediction in multiphase fluid regimes during formation evaluation or during production. Correlation of the responses can be used to interpret time resolved behavior of multiphase fluid regimes.

The method or a similar method can include acquiring responses from a second sensor; adjusting the known response using the responses from the second sensor; and generating a second scalar product between the vector of the responses and a vector of the adjusted known responses such that a second correlation factor is generated having a value within the fixed interval. This updating process provides a mechanism to drive the correlation factor to one to reflect that the conditions of the measured response correspond to the conditions reflected in conjunction with one or more additional sensors. The adjusted known response can be added to the response library from which the known response was accessed. This provides a means of updating the response library. In various embodiments, the responses from the sensor can be optical responses, an optical response being a response of an optical detector. Other embodiments may use other sensors.

In various embodiments, a method to provide correlation analysis of data can include acquiring responses from a sensor; acquiring additional responses from a second sensor; and identifying response patterns of the sensor in the additional responses from the second sensor; generating a scalar product between a vector of the responses and a vector of the identified response patterns such that a correlation factor is generated having a value within a fixed interval, one end of the fixed interval corresponding to a high correlation status and an opposite end of the fixed interval corresponding to an uncorrelated status. These operations can be performed by one or more processors operating to execute a number of procedures. The responses from the second sensor can include responses correlated to one or more of fluid density, viscosity, resistivity, or dielectric constant. With the response of the sensor highly correlated to observed patterns of one or more other sensors, the measured response can be added to a response library corresponding to the conditions of the response patterns of the one or more other sensors. In various embodiments, the responses from the sensor can be optical responses, an optical response being a response of an optical detector. Other embodiments may use other sensors.

In various embodiments, a machine-readable storage device can comprise instructions stored thereon, which, when performed by a machine, cause the machine to perform operations, the operations comprising one or more features similar to or identical to features of methods and techniques related to correlation of data described herein. The physical structure of such instructions may be operated on by one or more processors. Executing these physical structures can cause the machine to perform operations to acquire responses from a sensor; and to generate a scalar product between a vector of the responses and a vector of known responses such that a correlation factor is generated having a value within a fixed interval, one end of the fixed interval corresponding to a high correlation status and an opposite end of the fixed interval corresponding to an uncorrelated status. The instructions can include instructions to acquire responses from a sensor; to acquire additional responses from a second sensor; to identify response patterns of the sensor in the additional responses from the second sensor; and to generate a scalar product between a vector of the responses and a vector of the identified response patterns such that a correlation factor is generated having a value within a fixed interval, one end of the fixed interval corresponding to a high correlation status and an opposite end of the fixed interval corresponding to an uncorrelated status. The instructions can include instructions to operate sensors to provide data to a processing unit for processing in accordance with the teachings herein. The sensors may be downhole sensors or surface sensors at a well site. Further, a machine-readable storage device, herein, is a physical device that stores data represented by physical structures within the device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise a one or more sensors and a processing unit to process data from acquired from the one or more sensors to perform correlation analysis of data. The one or more sensors and the processing unit can be configured to perform one or more operations in accordance with techniques of correlation analysis of data that are similar to or identical to methods taught herein. The processing unit can be structured to perform processing techniques similar to or identical to the techniques discussed herein. The processing unit can be configured to process the acquired signals and process data related to or generated from the acquired signals. The processing unit may be arranged as an integrated unit or a distributed unit. The processing unit can be disposed at the surface of a wellbore to process data from operating a measurement tool downhole. The processing unit be disposed in a housing unit integrated with the measurement or arranged downhole in the vicinity of the tool structure.

In various embodiments, a scalar product of measured optical responses from a downhole tool and a set of known optical responses can be used to improve interpretation of optical systems. The known optical responses can be predetermined and stored in a standard oil library. This use of a scalar product allows for the rapid interpretation of phase behavior during down-hole sampling of reservoir fluids. This approach also allows automatic sorting of optical data for post processing. This analysis approach is not limited to optical data, nor is it limited to downhole data.

Optical responses from sensors utilized downhole can be difficult to interpret, especially in multi-phase fluid regimes that change rapidly with respect to the sampling frequency, for example during pumpout. To facilitate the interpretation of optical data, the detector responses of an optical system can be correlated to a set of known responses. One approach to perform this correlation is to use the scalar product, also referred to as an inner product, between optical responses (O) and a set of library responses (L), where each vector is normalized. An optical response can include a response of a corresponding optical detector. The form of the response, such as voltage, current, light, or digital representation, of the optical detector may depend on the application. The correlation (C) of a sample defined in equation (1) can scale between 0 and 1, with 1 being highly correlated and zero being uncorrelated.

$$C = \sum_{i=1}^{n}(O'_i \times L'_i), \tag{1}$$

$$\text{where: } O'_i = \frac{o_i}{\sqrt{\sum o_i^2}} \text{ and } L'_i = \frac{L_i}{\sqrt{\sum L_i^2}} \tag{2}$$

with the primed variables being the normalized value n being the number of measurements per sample. For example, a set of water responses and a set of oil responses can be measured and recorded in a controlled laboratory measurement. When an optical sensor is operated in the field, the measured responses can be correlated to the responses obtained a priori in controlled laboratory measured data. The correlation results can allow phase interpretation (water/oil or gas) of the field data.

Figure 2:
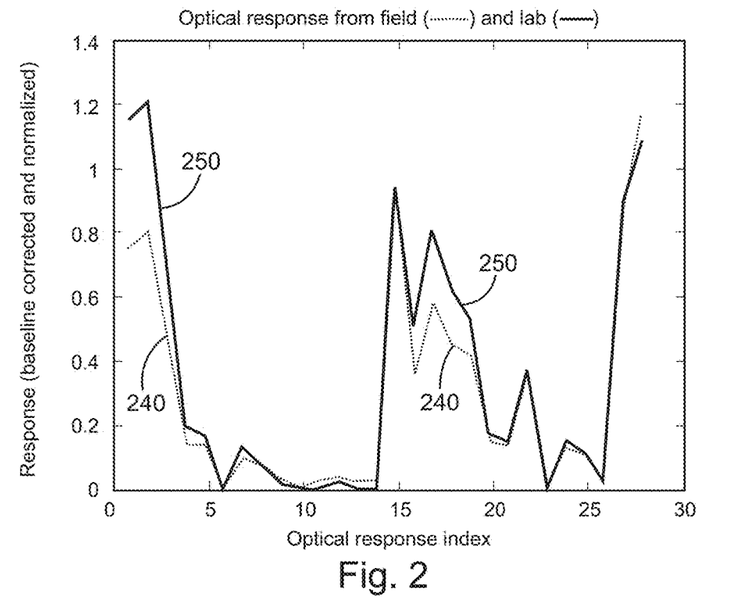
FIG. 2 shows an optical response for water obtained from a formation and pure water, in accordance with various embodiments.
Figure 3:
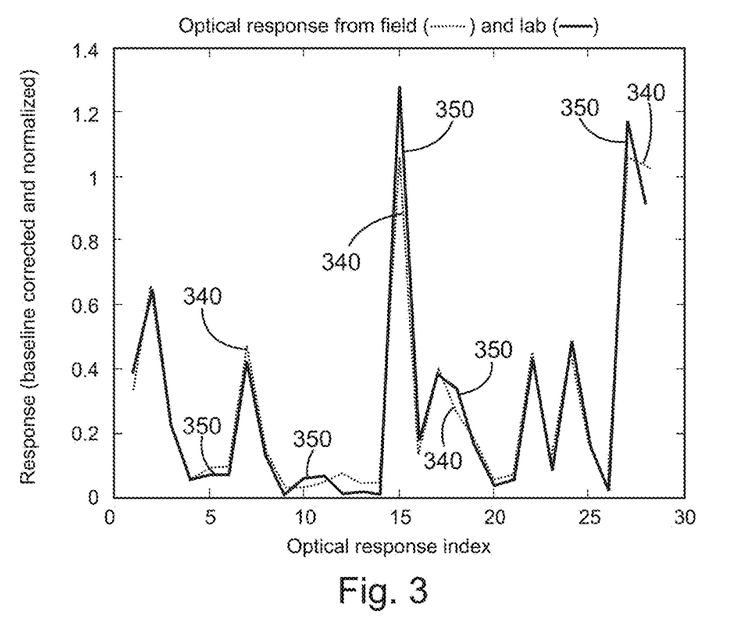
FIG. 3 shows an optical response for oil obtained from the formation and laboratory measured reservoir oil, in accordance with various embodiments.

FIG. 2 shows an optical response for water obtained from the formation 240 and pure water 250. Both filter responses were collected at 208° F. The differences are due to dissolved solids and gas and likely contain some level of filtrate contamination. FIG. 3 shows an optical response for oil obtained from the formation 340 and laboratory measured reservoir oil 350. Differences are likely due to dissolved gas and different saturate, aromatic, resin, and asphaltene hydrocarbons (SARA) composition.

Figure 4:
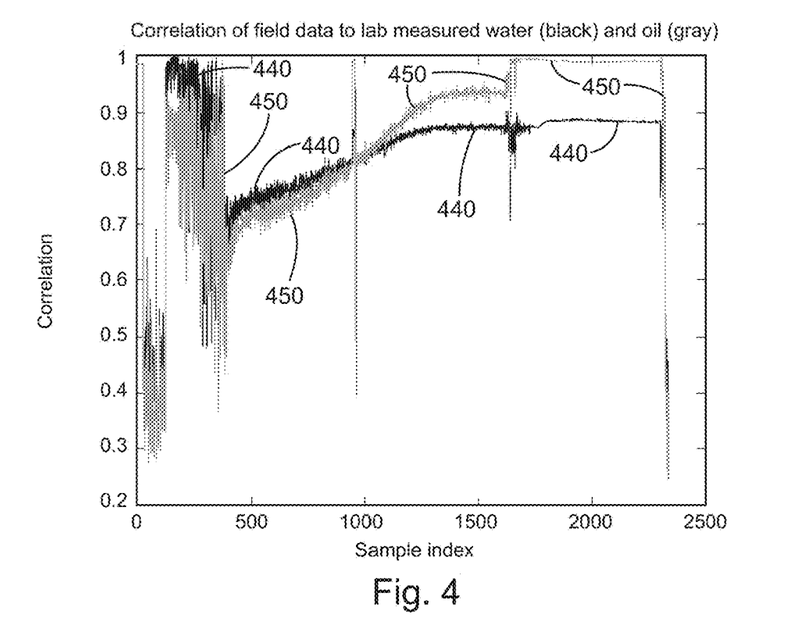
FIG. 4 illustrates correlation of field data to lab measured data for a formation pump out and sampling procedure, in accordance with various embodiments.

The field data can then be correlated to the optical responses obtained in the laboratory. The optical responses obtained in the laboratory may be stored in a database library. FIG. 4 illustrates this correlation of field data to lab measured water 440 and oil 450 for a formation pump out and sampling procedure. For each set of field responses, a correlation coefficient is calculated for both water and oil. A set of field responses is a sample that is taken as a number of measurements. For example, a set of measurements, defining a sample, can be made using optical filters mounted on a wheel rotated into an optical beam path that provides a measurement probe. These measurements of this sample can be transmitted for detection and analysis in different communication channels of the measurement system. Samples (sets of measurements) can be generated at different times. For analysis, a sample can be assigned a sample index, which can be correlated to a time of an event being monitored or measured. For example, for a formation pump out procedure, the sample index correlates to the timing of the procedure. As shown in FIG. 4, in the beginning of the pump out (sample index 150-250), the signals correlate better with water, but there is some correlation to oil indicating the fluid is mainly water with minute amounts of oil during the early cleaning up phase. At the later phase of cleaning up (sample index >1600), the signals correlate to oil and not water.

Figure 5:
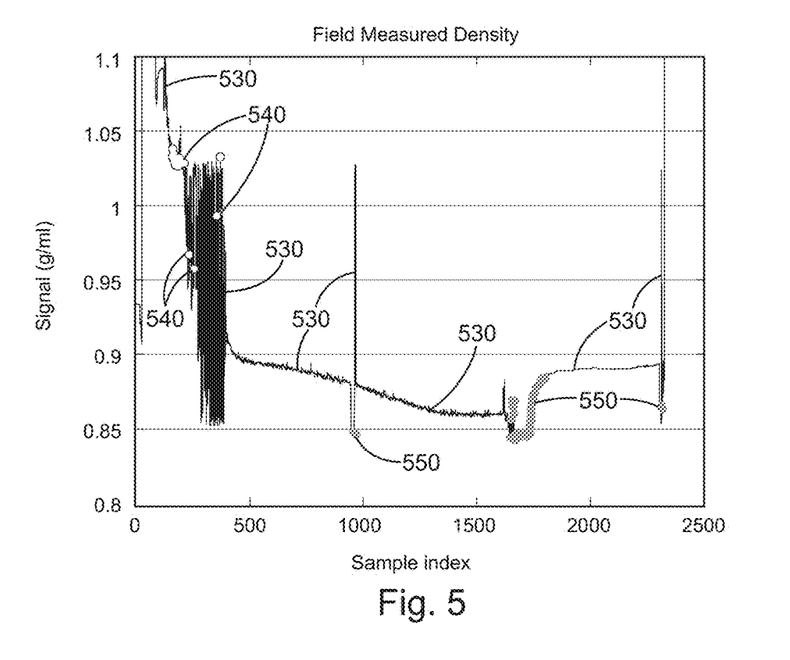
FIG. 5 shows measured density during pump out and sampling, in accordance with various embodiments.

A correlation threshold can be used to identify sets of optical data that are highly correlated to either water or oil. For example, a threshold of 0.99 was used to index samples for these phases with respect to the formation pump out procedure to which correlation in FIG. 4 was applied. FIG. 5 shows measured density 530 during pump out and sampling, where these indices were compared to measured density. The correlation technique was used to search the optical responses for water phase 540 and oil phase 550. This technique can be performed in real-time, which can provide an aid for use by operators.

In an alternative embodiment, a correlation method can be used without a priori knowledge of optic responses from known fluids. Instead, one can identify specific optic response patterns P from a second sensor such as fluid density, viscosity, resistivity, or dielectric constant, etc. These patterns can then be used to calculate the correlation.

$$C = \Sigma_{i=1}^{n}(O^1{}_i \times P^1{}_i), \quad (3)$$

where n is again the number of measurements per sample and the primed variables are the optical responses and pattern responses normalized as in equation (2). This correlation can also be compared to a threshold for analysis, interpretation, and to provide a basis for operational control signals.

The correlation of optical data can be utilized in a number of different applications for analysis and control of well-related tasks. The correlation can be used to point to a particular calibration to be used with respect to a measurement, based on a set of known oils in a database (classification). Correlation analysis can be used to determine contamination level during pump out. The correlation can be used in procedures for binning or sorting data for increased prediction performance in multi-phase fluid regimes, for example, during formation evaluation or during production. Some binning techniques use the absolute value of a detector response to interpret whether a response is for a sample of a particular phase. Correlation approaches, as taught herein, can use multivariate data analysis to aid interpretation of data. The correlation can be used to interpret time resolved behavior of multiphase fluid regimes. Other downhole sensor data can be used in conjunction with the optical data to improve interpretation of the optical data. For example, density and resistivity measurements can be concatenated with the optical data to automate interpretation, classification, determination of chemical properties, and determination of physical properties of fluids under measurement.

Apparatus and techniques using correlation procedures, as taught herein, can allow for easier and automated interpretation and analysis of data in real-time. Processes based on these correlation procedures can be used to provide real time contamination analysis using data being measured without a significant time lag. The measured data may be, but is not limited to, optical data. Such correlation analysis can also be used in pump out time calculations. These technique may save operators time in the field.

Multi-phase flow arises when sampling in reservoir formation evaluation operations. Examples of two phase flow are gas/oil flow and water/oil flow. This type of flow can make interpretation of downhole sensor data more difficult than single phase flow. For example, when measuring fluid from the formation as it enters the tool, which is used to collect the sample for later study, multi-phase flow can be observed as large signal fluctuations about some mean value. This condition occurs for density and capacitance sensors, for example, as the fluid's properties change rapidly in the interrogation region relative to the measurement frequency. Methods, as taught herein, can provide a mechanism to alert, in real-time, tool operators when multiphase flow exists.

The determination of when to capture a representative formation sample of fluid for later analysis is another important part of reservoir evaluation. The presence of contaminants from sources other than the formation can impact the quality of the analysis made on the reservoir's properties. For example, mud filtrate can be a contaminant to the analysis. analysis. Typically, operators qualitatively observe trends in a multitude of of signals from various fluid properties such as density, resistivity, and capacitance. When the trends are observed to reach asymptotic behavior, an operator will conclude that the sample is no longer changing and thus can be captured.

In various embodiments, a method of performing statistical analysis can be applied to downhole signals from reservoir formation evaluation tools. The method can use real-time data from downhole sensors. The statistical analysis can be applied to determine when multi-phase flow is present is the fluid. The method can also be used to alert a field engineer when it is suitable to collect reservoir fluid samples downhole.

Figure 6:
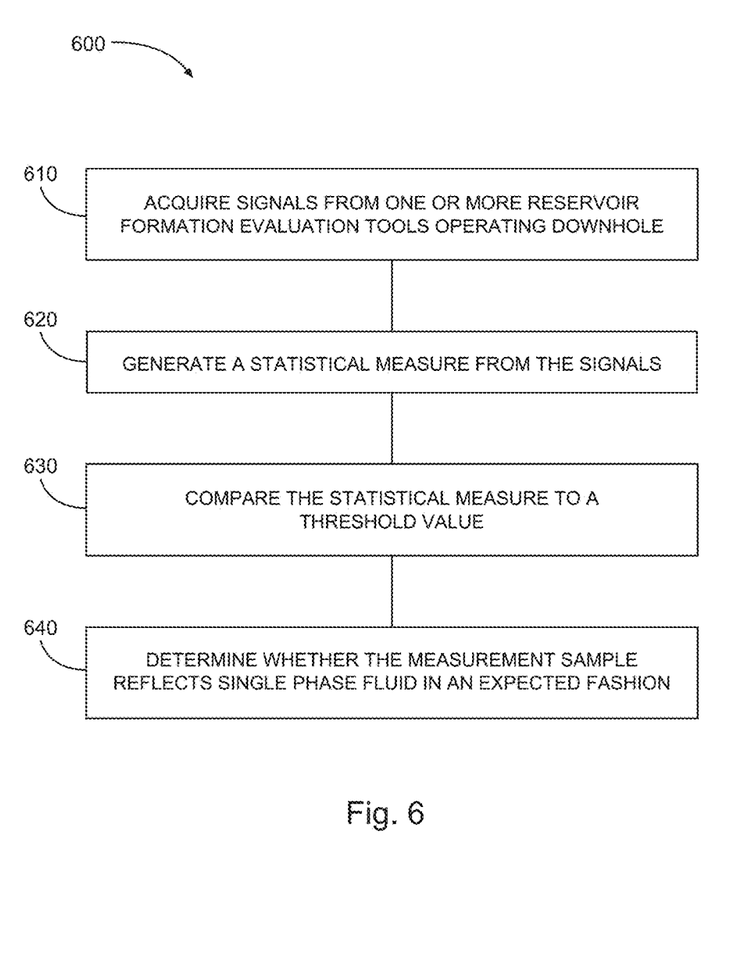
FIG. 6 shows features of an example method to provide statistical analysis of data, in accordance with various embodiments.

FIG. 6 shows features of an embodiment of an example method to provide statistical analysis of data. At 610, signals are acquired from one or more reservoir formation evaluation tools operating downhole. Acquiring the signals can include acquiring downhole signals from one or more of density measurements, capacitance measurements, viscosity measurements, resistivity measurements, or optical measurements. At 620, a statistical measure is generated from the signals. At 630, the statistical measure is compared to a threshold value. More than one threshold value can be used to determine different flow regimes or to differentiate abnormal conditions. At 640, it is determined whether the measurement sample reflects single phase fluid in an expected fashion. This determination can be based on the comparison. These operations can be performed by one or more processors operating to execute a number of procedures.

The method or a similar method can include using the comparison to determine suitability for capturing a downhole fluid sample. In determining such suitability, generating the statistical measure can include calculating a relative standard deviation by generating a standard deviation normalized to its associated mean. In determining such suitability, operations can be executed including using a plurality of types of measurement signals; generating a relative standard deviation for each type; generating an average of the relative standard deviations of each type; and performing the comparison with the threshold value using the average of the relative standard deviations as the statistical measure.

Generating the statistical measure can be realized by a number of different mechanisms. Generating the statistical measure can include calculating a running mean and standard deviation, where comparing the statistical measure to the threshold value can include comparing the standard deviation to the threshold value. Generating the statistical measure can include generating combinations of statistical measurements on the signals. Generating the statistical measure can include performing a Pearson's chi-squared test or an analysis of variance.

In various embodiments, a machine-readable storage device can comprise instructions stored thereon, which, when performed by a machine, cause the machine to perform operations, the operations comprising one or more features similar to or identical to features of methods and techniques related to statistical analysis of data from reservoir tools described herein. The physical structure of such instructions may be operated on by one or more processors. Executing these physical structures can cause the machine to perform operations to acquire signals from one or more reservoir formation evaluation tools operating downhole; to generate a statistical measure of a measurement sample from the signals; to compare the statistical measure to a threshold value; and to determine whether the measurement sample reflects single phase fluid in an expected fashion, based on the comparison. The instructions can include instructions to use the comparison to determine suitability for capturing a downhole fluid sample similar or identical to operations taught herein. The instructions can include instructions to operate one or more reservoir formation evaluation tools to provide data to a processing unit for processing in accordance with the teachings herein. The one or more reservoir formation evaluation tools may be downhole evaluation tools or surface evaluation tools at a well site.

In various embodiments, a system can comprise one or more reservoir formation evaluation tools and a processing unit to process data acquired from the one or more reservoir formation evaluation tools. The one or more reservoir formation evaluation tools and the processing unit can be configured to perform one or more operations according techniques for statistical analysis of data from reservoir tools that are similar to or identical to methods taught herein. The processing unit can be configured to process the acquired signals and process data related to or generated from the acquired signals. The processing unit may be arranged as an integrated unit or a distributed unit. The processing unit can be disposed at the surface of a wellbore to process data from operating a measurement tool downhole. The processing unit be disposed in a housing unit integrated with the measurement or arranged downhole in the vicinity of the tool structure.

Sensors in downhole drilling and evaluation are used to measure fluid properties including density, capacitance, and resistivity. Optical sensors are also utilized in downhole drilling and evaluation to measure formation fluid properties, for example the fluid's transmittance, absorbance, or reflectance. Optical sensors can be realized by a number of different optical devices, which can include integrated optical element (ICE) technology.

Figure 7:
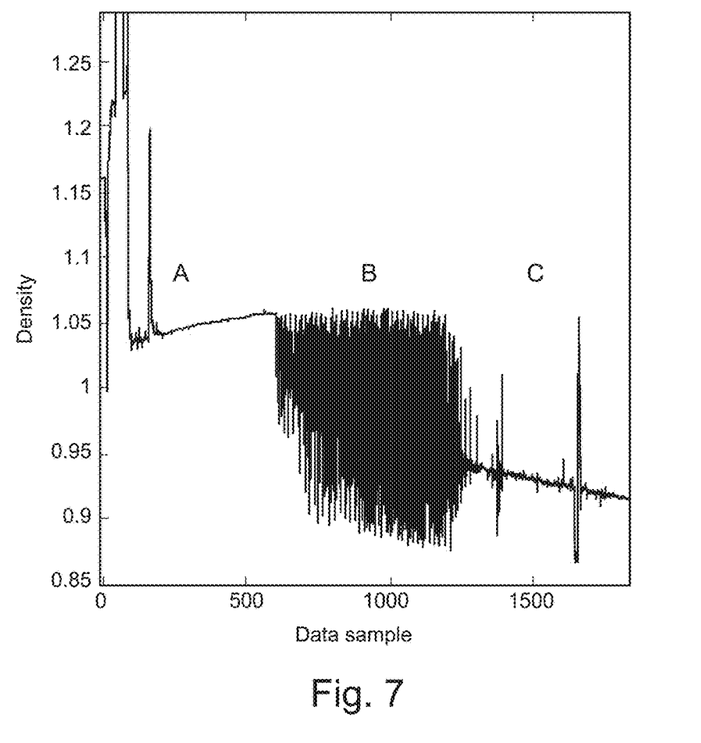
FIG. 7 shows typical downhole density measurements collected during a pump out operation, in accordance with various embodiments.

FIG. 7 shows typical downhole density measurements collected during a pump out operation. At region A, the system is initialized in the presence of formation $H_2O$. The signal eventually reaches a maximum as the system equilibrates to a maximum $H_2O$ concentration. When the fluid sampled from the formation traverses in to a multiphase condition such as water-oil flow, the signal shows large variations, at region B. In region C, the system is observed to move back to a single phase while the pumpout commences. When the density is observed to reach an asymptote, the system is configured to collect a sample and, then, the system is returned to an idle condition (or an idle state).

Statistical analysis of signals already in use in downhole tools can be applied to determine when multiphase conditions exist downhole in a fluid system. A statistical measure of generated measured signals can be compared to a threshold to determine whether the measurement reflects single phase fluid in an expected fashion, multiphase fluid flow, an abnormal condition, or an unexpected signal. The generation of the statistical measure can involve calculating a running mean and standard deviation of the signal.

can be used to define the standard deviation given by:

$$s = \sqrt{\frac{1}{N-1} \sum_{i=1}^{N} (x_i - \bar{x})^2}, \quad (4)$$

where N is the width of the running window, $\{x_1, x_2, x_3 \ldots, x_n\}$ are the observed measurements in each window, and $\bar{x}$ is the mean of these measurements. Statistics other than mean and standard deviation can be used to generate a measure to be compared to a threshold.

Figure 8A:
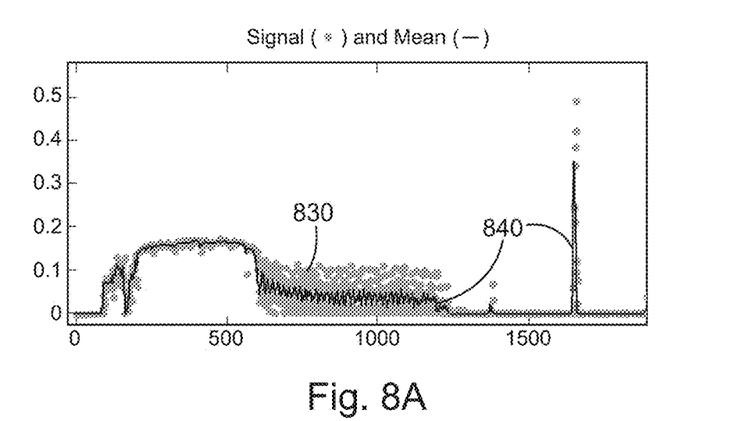
FIG. 8A shows a representative optical signal of an optical measurement on the same fluid observed by the densitometer for the pump out operation shown in FIG. 7, in accordance with various embodiments.

FIG. 8A shows a representative optical signal of an optical measurement on the same fluid observed by the densitometer for the pump out operation shown in FIG. 7. The optical signals are represented by measurement points 830 and the curve 840 represents the mean for each sample over the running window.

Figure 8B:
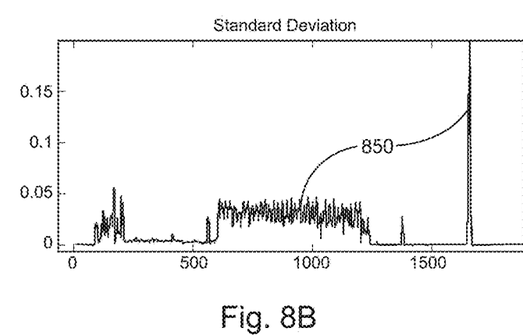
FIG. 8B illustrates the standard deviation from the signal of FIG. 8A, in accordance with various embodiments.

FIG. 8B illustrates the standard deviation 850 of the signal of FIG. 8A, where N=6 in equation (4). As illustrated in FIG. 8B, the standard deviation of the signal, when greater than 0.01, correlates to a multiphase water-oil fluid regime. High standard deviation also occurs where the system is perturbed by different tool component actuation. For example, when shifting the fluid pumping between two straddle packers from the upper port to the lower port, which is reflected at sample index 1650 in FIGS. 8A and 8B.

Figure 9:
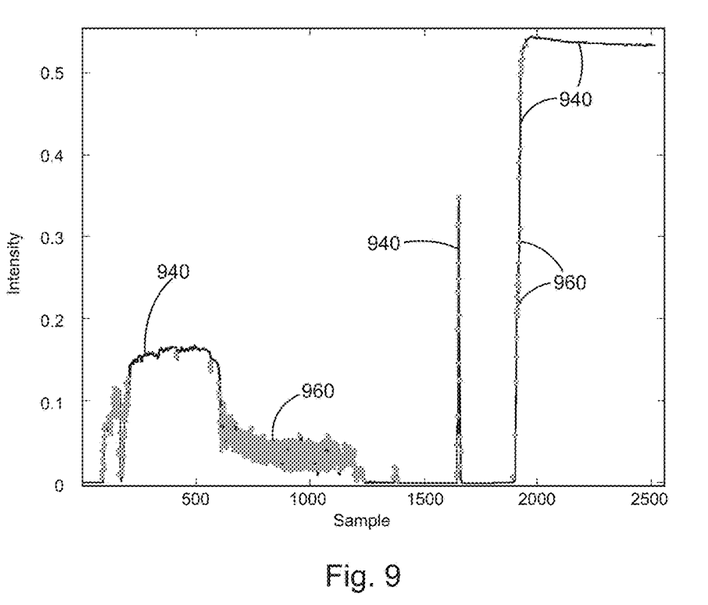
FIG. 9 shows a running mean of an optical signal with respect to samples designated as multiphase or abnormal, in accordance with various embodiments.

A threshold can be used to determine whether the system was measuring a single phase fluid in an expected fashion. In other words, the threshold will flag measurements that may be multiphase fluid flow, an abnormal condition, or an unexpected optical signals. FIG. 9 shows a running mean 940 of an optical signal with respect to samples 960 designated as multiphase or abnormal. A threshold of 0.01 was used for the data in FIG. 9 to determine whether the system was measuring a single phase fluid in an expected fashion.

It can be appreciated that various statistical measurements or combinations of statistical measurements on the downhole signal can be used in similar or identical manner to using a running mean and standard deviation of the signal with respect to a threshold as taught herein. These statistical measurements or combinations of statistical measurements can include, but are not limited to, Pearson's chi-squared test or analysis of variance (ANOVA). More than one threshold can be used to determine different flow regimes (e.g. oil-water, gas-oil) or to differentiate abnormal conditions (e.g. pump start/stop valve actuation). Using these techniques, a single sensor may be used in determination of multi-phase flow.

In addition to determining whether the system is measuring a single phase fluid in an expected fashion, downhole signals can be analyzed further to determine when it is suitable for collecting a downhole sample. Statistical analysis can be applied to provide the determination of suitability for capturing downhole fluid sample. Equation (5) can be used to calculate a running % relative standard deviation (% RSD), which is the standard deviation of equation (4) normalized to the mean (in percent %).

$$\% \ RSD = 100\% \times s / \bar{x} \tag{5}$$

The downhole signals can be one or more of the downhole signals used in a typical drilling and evaluation of reservoir formations including, but not limited to, density measurements, capacitance measurements, viscosity measurements, resistivity measurements, or optical measurements. When using more than one signal type, a % RSD can be calculated for each signal type, then these % RSD values can be averaged.

As taught herein, different statistical approaches can be used in analysis techniques to interpret reservoir formation evaluation data. Different forms of data can be used including optical data, for example, optical data similar to that recorded from a system employing ICE technology. The analysis provides a mechanism to lead to better accuracy in sampling downhole fluids during pumpout and cleanout operations. Better understating of the data originating from a reservoir evaluation tool may lead to a better interpretation and expectations from users.

Figure 10:
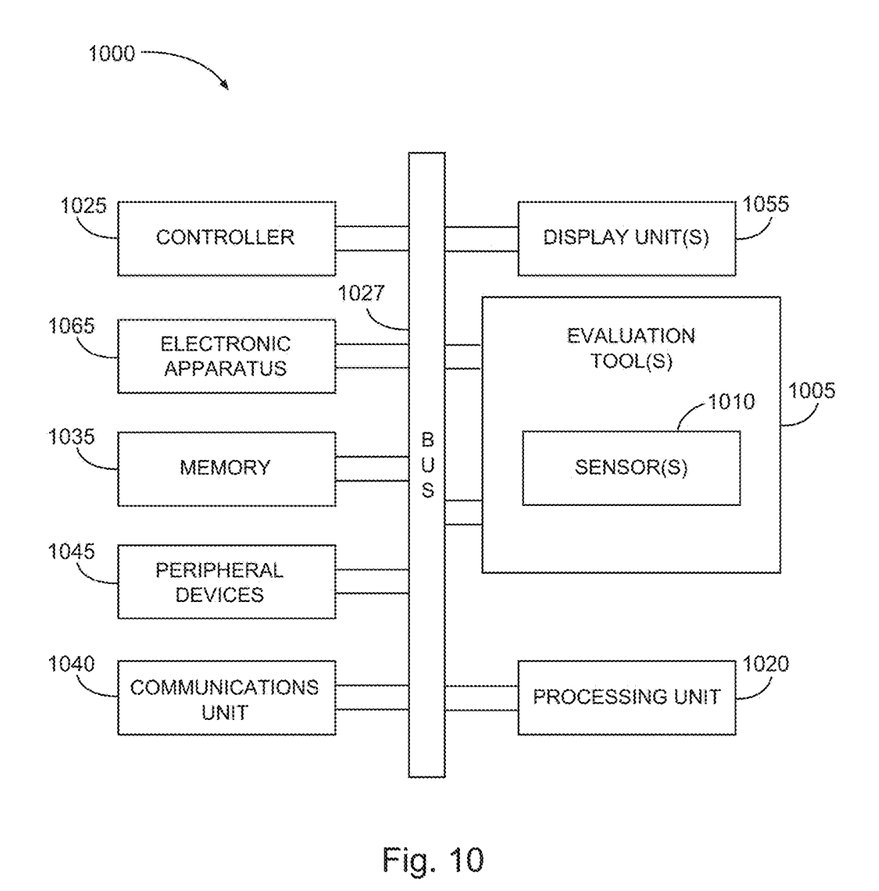
FIG. 10 depicts a block diagram of features of an example system operable to perform a correlation of data and/or a statistical analysis of data, in accordance with various embodiments.

FIG. 10 depicts a block diagram of features of an embodiment of an example system 1000 operable to perform a correlation of data and/or a statistical analysis of data. The system 1000 includes one or more tools 1005 having one or more sensors 1010 operable to make with respect to a wellbore. The system 1000 can also include a controller 1025, a memory 1035, an electronic apparatus 1065, and a communications unit 1040. The controller 1025 and the memory 1035 can be arranged to operate the one or more evaluation tools 1005 to acquire measurement data as the one or more evaluation tools 1005 are operated. The controller 1025 and the memory 1035 can be realized to control activation and data acquisition of the one or more sensors 1010 and to manage processing schemes with respect to data as described herein. Memory 1035 can be realized as one or more machine-readable storage devices having instructions stored thereon, which, when performed by a machine, cause the machine to perform operations, the operations comprising correlation of data and/or a statistical analysis of data as taught herein. Processing unit 1020 can be structured to perform the operations to manage processing schemes implementing a correlation of data and/or a statistical analysis of data in a manner similar to or identical to embodiments described herein.

Electronic apparatus 1065 can be used in conjunction with the controller 1025 to perform tasks associated with taking measurements downhole with the one or more sensors 1010 of the one or more evaluation tools 1005. The communications unit 1040 can include downhole communications in a drilling operation. Such downhole communications can include a telemetry system.

The system 1000 can also include a bus 1027, where the bus 1027 provides electrical conductivity among the components of the system 1000. The bus 1027 can include an address bus, a data bus, and a control bus, each independently configured. The bus 1027 can also use common conductive lines for providing one or more of address, data, or control, the use of which can be regulated by the controller 1025. The bus 1027 can include optical transmission medium to provide optical signals among the various components of system 1000. The bus 1027 can be configured such that the components of the system 1000 are distributed. The bus 1027 may include network capabilities. Such distribution can be arranged between downhole components such as one or more sensors 1010 of the one or more evaluation tools 1005 and components that can be disposed on the surface of a well. Alternatively, various components can be co-located such as on one or more collars of a drill string, on a wireline structure, or other measurement arrangement.

In various embodiments, peripheral devices 1045 can include displays, additional storage memory, and/or other control devices that may operate in conjunction with the controller 1025 and/or the memory 1035. In an embodiment, the controller 1025 can be realized as one or more processors. The peripheral devices 1045 can be arranged to operate in conjunction with display unit(s) 1055 with instructions stored in the memory 1035 to implement a user interface to manage the operation of the one or more evaluation tools 1005 and/or components distributed within the system 1000. Such a user interface can be operated in conjunction with the communications unit 1040 and the bus 1027. Various components of the system 1000 can be integrated with the one or more evaluation tools 1005 such that processing identical to or similar to the processing schemes discussed with respect to various embodiments herein can be performed downhole in the vicinity of the measurement or at the surface.

Figure 11:
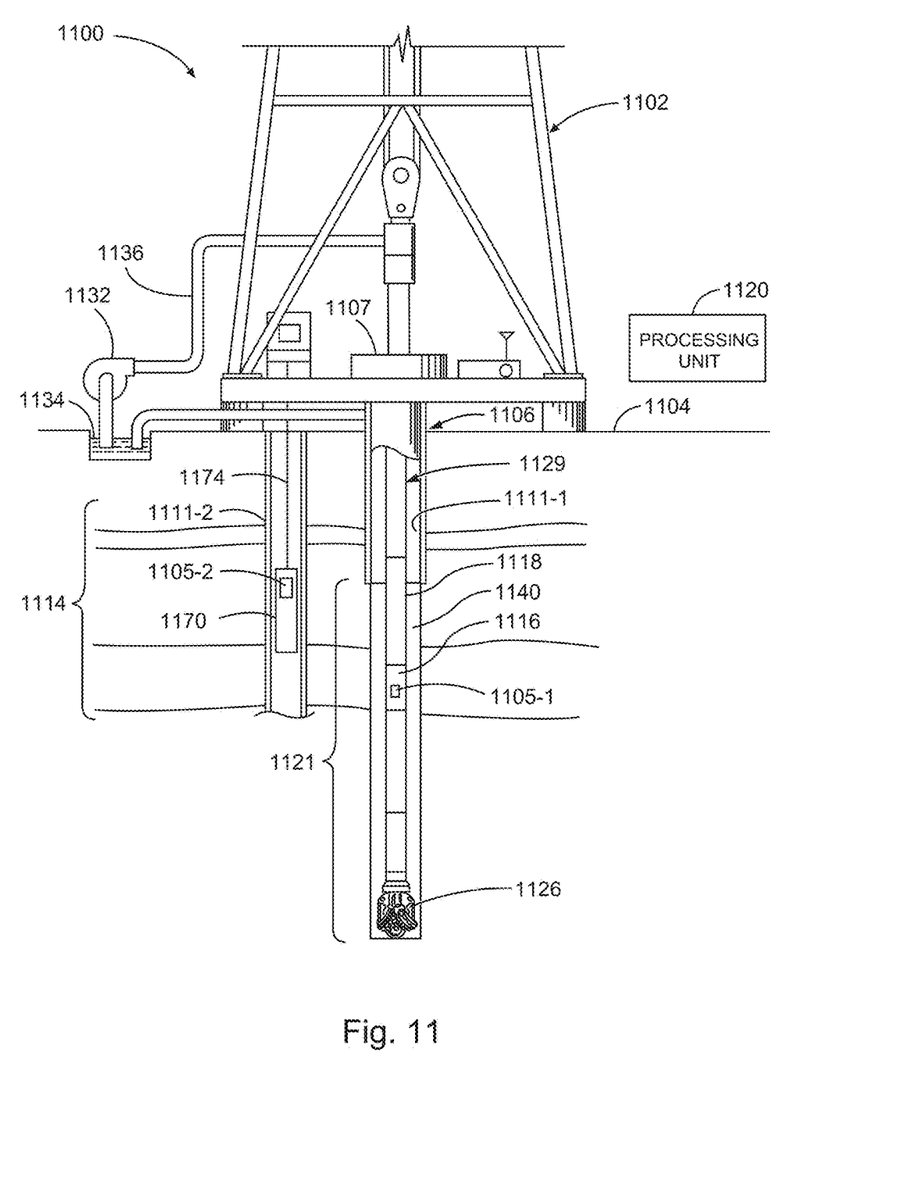
FIG. 11 depicts an example system at a drilling site, where the system is operable to perform a correlation of data and/or a statistical analysis of data, in accordance with various embodiments.

FIG. 11 depicts an embodiment of a system 1100 at a drilling site, where the system 1100 includes an apparatus operable to perform a correlation of data and/or a statistical analysis of data. The system 1100 can include a tool 1105-1, 1105-2, or both 1105-1 and 1105-2 having an arrangement of sensors operable to make measurements that can be used for a number of drilling tasks. The tools 1105-1 and 1105-2 may be structured identical to or similar to a tool architecture or combinations of tool architectures discussed herein, including control units and processing units operable to perform processing schemes in a manner identical to or similar to processing techniques discussed herein. The tools 1105-1, 1105-2, or both 1105-1 and 1105-2 can be distributed among the components of system 1100. The tools 1105-1 and 1105-2 can be realized in a similar or identical manner to arrangements of sensors and processing units discussed herein. The tools 1105-1 and 1105-2 can be structured and fabricated in accordance with various embodiments as taught herein.

The system 1100 can include a drilling rig 1102 located at a surface 1104 of a well 1106 and a string of drill pipes, that is, drill string 1129, connected together so as to form a drilling string that is lowered through a rotary table 1107 into a wellbore or borehole 1111-1. The drilling rig 1102 can provide support for the drill string 1129. The drill string 1129 can operate to penetrate rotary table 1107 for drilling the borehole 1111-1 through subsurface formations 1114. The drill string 1129 can include a drill pipe 1118 and a bottom hole assembly 1121 located at the lower portion of the drill pipe 1118.

The bottom hole assembly 1121 can include a drill collar 1116 and a drill bit 1126. The drill bit 1126 can operate to create the borehole 1111-1 by penetrating the surface 1104 and the subsurface formations 1114. The bottom hole assembly 1121 can include the tool 1105-1 attached to the drill collar 1116 to conduct measurements to determine formation parameters. The tool 1105-1 can be structured for an implementation as a MWD system such as a LWD system. The housing containing the tool 1105-1 can include electronics to initiate measurements from selected sensors and to collect measurement signals from selected detectors. Such electronics can include a processing unit to provide correlation of data and/or statistical analysis of data over a standard communication mechanism for operating in a well. Alternatively, electronics can include a communications interface to provide measurement signals collected by the tool 1105-1 to the surface over a standard communication mechanism for operating in a well, where these measurements signals can be analyzed at a processing unit 1120 at the surface to provide correlation of data and/or statistical analysis of data.

During drilling operations, the drill string 1129 can be rotated by the rotary table 1107. In addition to, or alternatively, the bottom hole assembly 1121 can also be rotated by a motor (e.g., a mud motor) that is located downhole. The drill collars 1116 can be used to add weight to the drill bit 1126. The drill collars 1116 also can stiffen the bottom hole assembly 1121 to allow the bottom hole assembly 1121 to transfer the added weight to the drill bit 1126, and in turn, assist the drill bit 1126 in penetrating the surface 1104 and the subsurface formations 1114.

During drilling operations, a mud pump 1132 can pump drilling fluid (sometimes known by those of skill in the art as "drilling mud") from a mud pit 1134 through a hose 1136 into the drill pipe 1118 and down to the drill bit 1126. The drilling fluid can flow out from the drill bit 1126 and be returned to the surface 1104 through an annular area 1140 between the drill pipe 1118 and the sides of the borehole 1111-1. The drilling fluid may then be returned to the mud pit 1134, where such fluid is filtered. In some embodiments, the drilling fluid can be used to cool the drill bit 1126, as well as to provide lubrication for the drill bit 1126 during drilling operations. Additionally, the drilling fluid may be used to remove subsurface formation cuttings created by operating the drill bit 1126.

In various embodiments, the tool 1105-2 may be included in a tool body 1170 coupled to a logging cable 1174 such as, for example, for wireline applications. The tool body 1170 containing the tool 1105-2 can include electronics to initiate measurements from selected sensors and to collect measurement signals from selected detectors. Such electronics can include a processing unit to provide correlation of data and/or statistical analysis of data over a standard communication mechanism for operating in a well. Alternatively, electronics can include a communications interface to provide measurement signals collected by the tool 1105-2 to the surface over a standard communication mechanism for operating in a well, where these measurements signals can be analyzed at processing unit 1120 at the surface to provide correlation of data and/or statistical analysis of data. The logging cable 1174 may be realized as a wireline (multiple power and communication lines), a mono-cable (a single conductor), and/or a slick-line (no conductors for power or communications), or other appropriate structure for use in the borehole 1111-2. Though FIG. 11 depicts both an arrangement for wireline applications and an arrangement for LWD applications, the system 1100 may be also structured to provide one of the two applications. Measurement architectures other than wireline or LWD architectures may be used.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method for utilizing fluid phase behavior interpretation to increase sensor measurement information accuracy, said method comprising:
    measuring, by a downhole sensor, detector responses within a measurement sample of a downhole fluid;
    acquiring the measured detector responses from the downhole sensor;
    generating a correlation factor as a scalar product between a vector of the measured detector responses and a vector of known responses, wherein the correlation factor has a value within a fixed interval, one end of the fixed interval corresponding to a high correlation status and an opposite end of the fixed interval corresponding to an uncorrelated status;
    comparing the correlation factor to a correlation threshold for a specified material; and
    identifying sets of data having correlation factors greater than the correlation threshold.

2. The method of claim 1, wherein the method includes retrieving the known responses from a library of responses.

3. The method of claim 1, wherein the measured detector responses and the known responses are normalized and the fixed interval is an interval from zero to one.

4. The method of claim 1, wherein said acquiring the measured detector responses includes acquiring the measured detector responses in a well-related operation, and said generating a correlation factor is performed with respect to oil, water, or both oil and water.

5. The method of claim 4, wherein the method includes determining contamination levels during a pump out operation in the well-related operation.

6. The method of claim 1, wherein said acquiring the measured detector responses includes acquiring the measured detector responses in a well-related operation, and said generating a correlation factor is used to determine a calibration to be used in the well-related operation, based on a set of known oils in a database.

7. The method of claim 1, wherein said acquiring the measured detector responses includes acquiring the measured detector responses in a well-related operation, and said generating a correlation factor is used to sort data for performance prediction in multiphase fluid regimes during formation evaluation or during production.

8. The method of claim 1, wherein said acquiring the measured responses includes acquiring the measured responses in a well-related operation, and wherein the correlation factor is used to interpret time resolved behavior of multiphase fluid regimes.

9. The method of claim 1, wherein the method includes:
acquiring measured detector responses from a second sensor;
adjusting the known responses using the measured detector responses from the second sensor; and
generating a second correlation factor as a second scalar product between the vector of the measured detector responses from the second sensor and a vector of the adjusted known responses, wherein the second correlation factor has a value within the fixed interval.

10. The method of claim 1, wherein the measured detector responses are optical responses, an optical response being a response of an optical detector.

11. A system for utilizing fluid phase behavior interpretation to increase sensor measurement information accuracy, said system comprising:
one or more downhole sensors configured to measure detector responses within a measurement sample of a downhole fluid; and
a processing unit, the one or more downhole sensors and the processing unit configured to:
acquire the measured detector responses from the one or more downhole sensors;
generate a correlation factor as a scalar product between a vector of the measured detector responses and a vector of known responses; wherein the correlation factor has a value within a fixed interval, one end of the fixed interval corresponding to a high correlation status and an opposite end of the fixed interval corresponding to an uncorrelated status;
compare the correlation factor to a correlation threshold for a specified material; and
identify sets of data having correlation factors greater than the correlation threshold.

12. The system of claim 11, wherein the one or more downhole sensors and the processing unit are further configured to retrieve the known responses from a library of responses.

13. The system of claim 11, wherein the measured detector responses and the known responses are normalized and the fixed interval is an interval from zero to one.

14. The system of claim 11, wherein the one or more downhole sensors and the processing runt are further configured to acquire the measured detector responses in a well-related operation, and said generating a correlation factor is performed with respect to oil, water, or both oil and water.

15. The system of claim 11, wherein the one or more downhole sensors and the processing unit are further configured to acquire the measured detector responses in a well-related operation, and wherein said generating a correlation factor is used to sort data for performance prediction in multiphase fluid regimes during formation evaluation or during production.

16. The system of claim 11, wherein the one or more downhole sensors and the processing unit are further configured to:
acquire measured detector responses from a second sensor;
adjust the known responses using the measured detector responses from the second sensor; and
generate a second correlation factor as a second scalar product between the vector of the measured detector responses from the second sensor and a vector of the adjusted known responses, wherein the second correlation factor has a value within the fixed interval.

* * * * *